Figure 1:
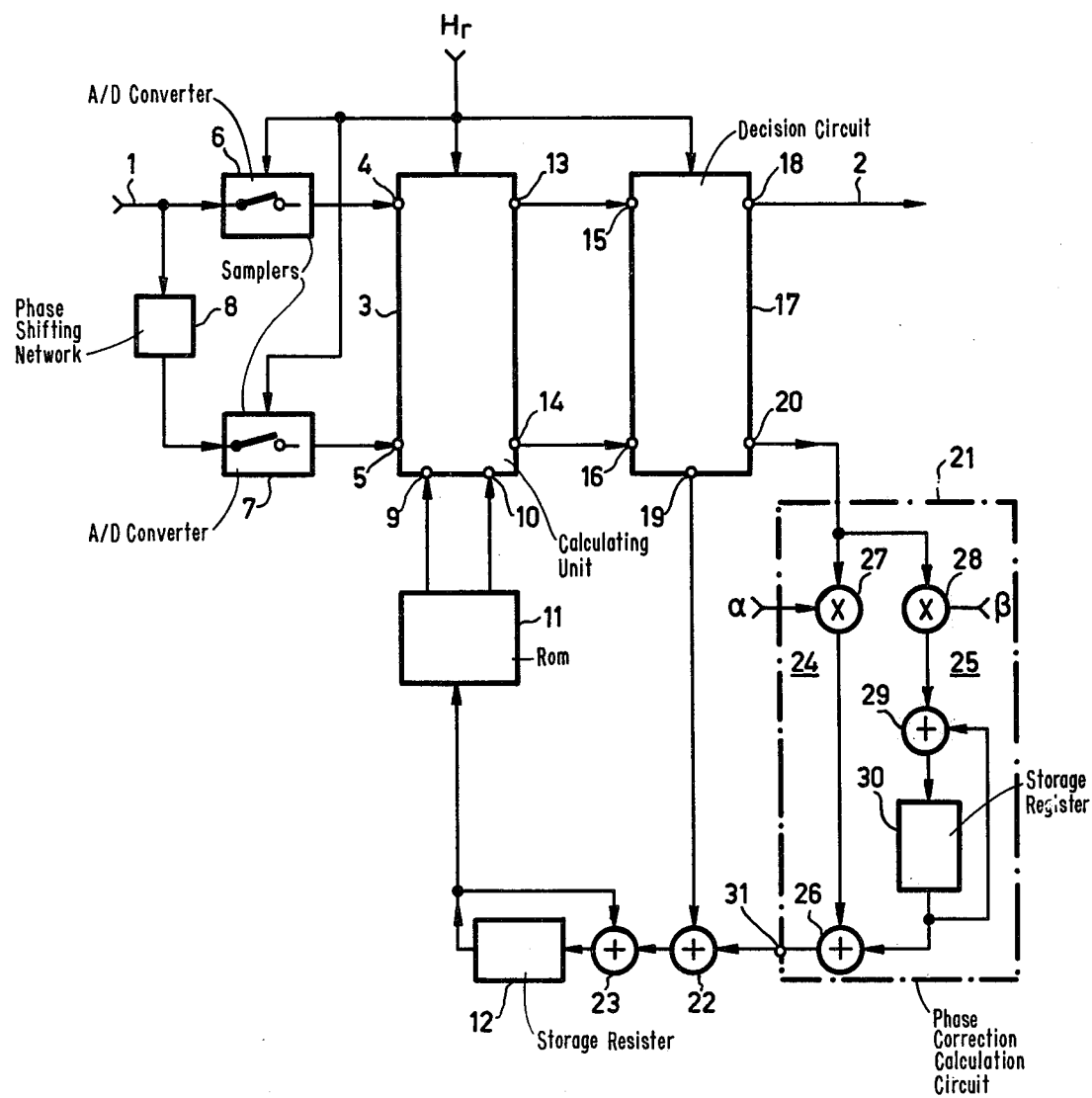

United States Patent [19]

Guidoux et al.

[11] 4,174,489
[45] Nov. 13, 1979

[54] PHASE DISCRIMINATOR IN A RECEIVER FOR A DATA TRANSMISSION SYSTEM

[75] Inventors: Loïc B. Y. Guidoux; Jean-Louis Renaudat, both of Le Plessis Robinson, France

[73] Assignee: Telecommunications Radioelectriques et Telephoniques TRT, Paris, France

[21] Appl. No.: 924,193

[22] Filed: Jul. 13, 1978

Related U.S. Application Data

[63] Continuation of Ser. No. 753,270, Dec. 22, 1976, abandoned.

[51] Int. Cl.² ............................................. H03K 9/06
[52] U.S. Cl. .................................... 325/320; 364/702
[58] Field of Search ............... 364/485, 701, 702, 703; 329/105; 333/18; 328/139, 140, 141, 133, 134; 325/320, 349; 178/66 R–88

[56] References Cited

U.S. PATENT DOCUMENTS 3,598,974  8/1971  Lincoln ................................ 364/702

*Primary Examiner*—Benedict V. Safourek
*Attorney, Agent, or Firm*—Thomas A. Briody; William J. Streeter; Edward W. Goodman

[57] ABSTRACT

Phase discriminator in a receiver of a system for data transmission by means of phase modulation of a carrier. The phase discriminator comprises a calculating unit arranged for receiving digital signals, whose associated signal samples occur at a rate equal to the data modulation rate, the digital signals being representative of the inphase and quadrature components of the received passband signals at each sampling instant and of the inphase and quadrature components of a reference carrier at a preceding sampling instant. This calculating unit calculates the signal samples of digital signals which are representative of the in-phase and quadrature components of a signal which is derived from the received passband signal by a phase shift over an angle which is equal and opposite to the phase of the reference carrier at the preceding sampling instant. The digital signals supplied by the calculating unit are applied to a decision circuit which at each sampling instant determines the phase variation of the transmitted carrier during one sampling period and reproduces the corresponding phase jump. In case the reference carrier is locally generated, the decision circuit also supplies an error signal for locking the phase of the local reference carrier on the received carrier.

11 Claims, 11 Drawing Figures

PHASE DISCRIMINATOR IN A RECEIVER FOR A DATA TRANSMISSION SYSTEM

This is a continuation of application Ser. No. 753,270, filed Dec. 22, 1976, now abandoned.

The invention relates to a phase discriminator in a receiver of a system for data transmission by means of phase modulation of a carrier.

For transmitting data at a rate of 4800 bits/s eight-phase modulation is used in a standardized modem, the data to be transmitted first being divided into 3-bit groups and thereafter, at a rate of 1600 Bauds, coded in the form of phase jumps of a 1800 Hz carrier. The phase discriminator of the receiver serves for reproducing these phase jumps.

In the prior art phase discriminators, for instance such as described in U.S. Pat. No. 3,643,023, a phase measurement is performed at instants corresponding to the data modulation rate by means of a time measurement which is based on the instants of the zero crossings of an analog signal derived from the signal receiver. To increase the measuring accuracy this analog signal is produced by transposing the passband signal received to a higher frequency band which, for example, in the case of a 4800 bits/s modem is located on either side of the frequency of 14,400 Hz.

This essentially analog type of phase discriminator has the drawback that it considerably complicates the structure of the receiver when this receiver is, for example, connected to the switched telephone system and, for the automatic and auto-adaptive equalization of the transmission channel, use is made of a digital passband equalizer located before the phase discriminator. Such a passband equalizer is, for example, described in U.S. Pat. No. 4,035,725. In fact, a receiver of this type must be provided with an analog-to-digital converter arranged before the equalizer, and with a digital-to-analog converter arranged behind the equalizer and followed by a lowpass filter for reproducing the equalized passband signal in the analog form necessary for the operation of the phase discriminator. This structure with a double conversion, analog-to-digital and digital-to-analog, is rather cumbersome and has the drawback that analog filters are arranged behind the equalizer so that the latter cannot correct them. Finally, for the correct reproduction of the analog signal at the input of the phase discriminator, it is necessary that the sampling frequency in the analog-to-digital converter before the equalizer, in accordance with Shannon's theorem, is at least twice the maximum frequency of the passband signal; for example, in the 4800 bits/s modem in which the frequency band of the passband signal is situated between 600 Hz and 3000 Hz, this sampling frequency must be at least 6000 Hz. The comparatively high sampling frequency necessary for the operation of the phase discriminator is, however, superfluous for the proper operation of the passband equalizer itself because the coefficients of the digital filters in this equalizer need only be changed at a rate equal to the data modulation rate (1600 Hz in the case of the 4800 bits/s modem).

It is an object of the invention to provide a fully digital phase discriminator which processes a signal sampled at a rate equal to the data modulation speed and which, consequently, is suitable for direct connection to the output of a digital passband equalizer which processes a signal sampled at the same rate.

The phase discriminator according to the invention is characterized in that the phase discriminator comprises a calculating unit arranged for receiving digital signals whose associated signal samples occur at a rate equal to the data modulation rate, which digital signals are representative of the in-phase and quadrature components of a received passband signal at each sampling instant and of the in-phase and quadrature components of a reference carrier at the preceding sampling instant, which calculating unit is provided with means for calculating the signal samples of digital signals which are representative of the in-phase and quadrature components of a signal derived from the received passband signal by a phase rotation over an angle which is equal and opposite to the phase of the reference carrier at the preceding sampling instant, the digital signals provided by the calculating unit being applied to a decision circuit means which at each sampling instant determines the phase variation of the transmitted carrier during one sampling period and reproduces the corresponding phase jump.

The invention will be further explained with reference to the accompanying drawings.

Figure 2:
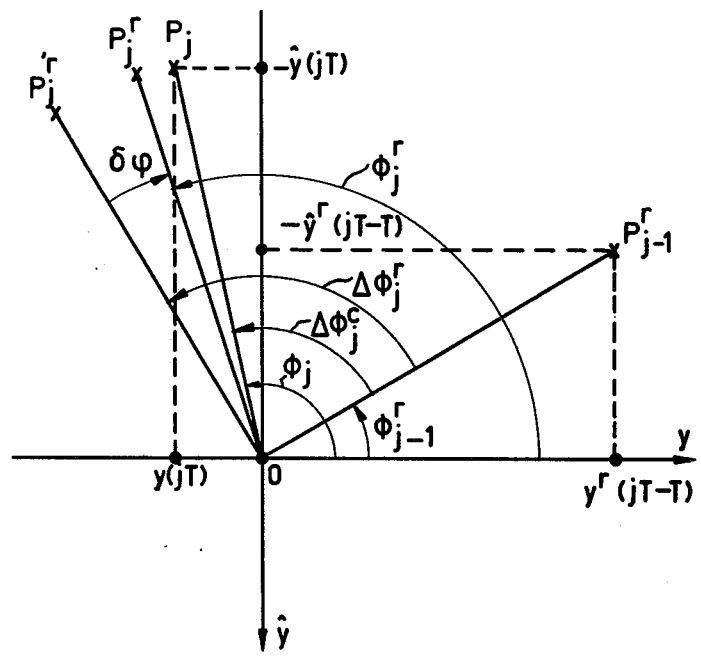
Figure 3:
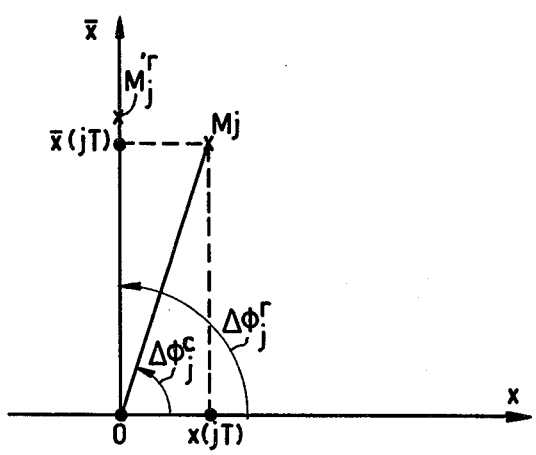
Figure 4:
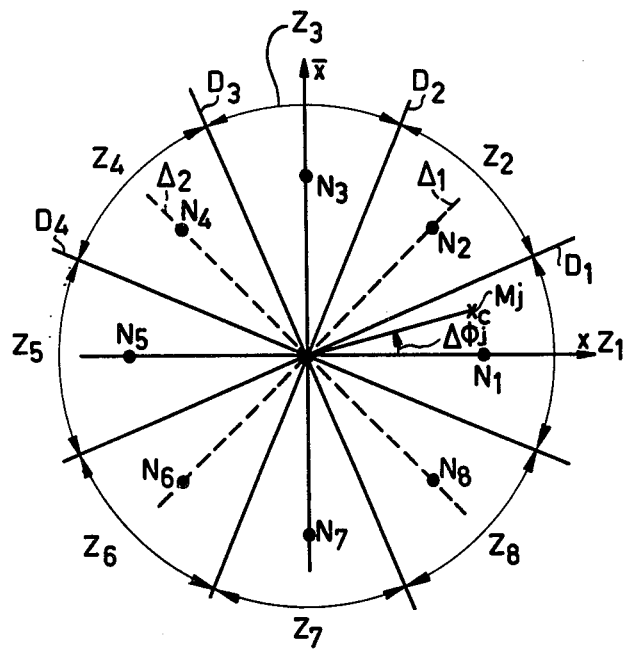
Figure 5:
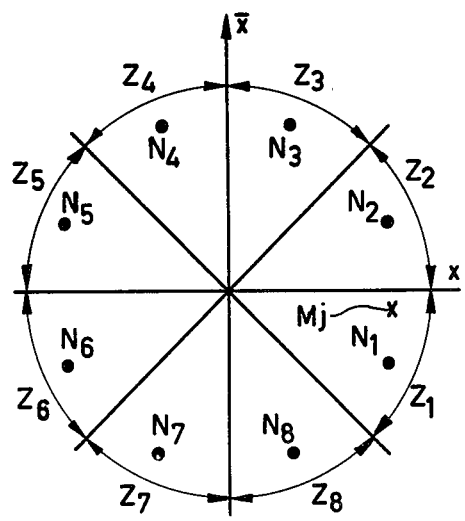
Figure 6:
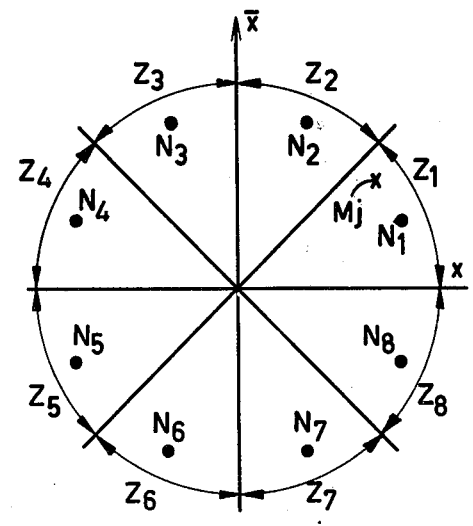
Figure 7:
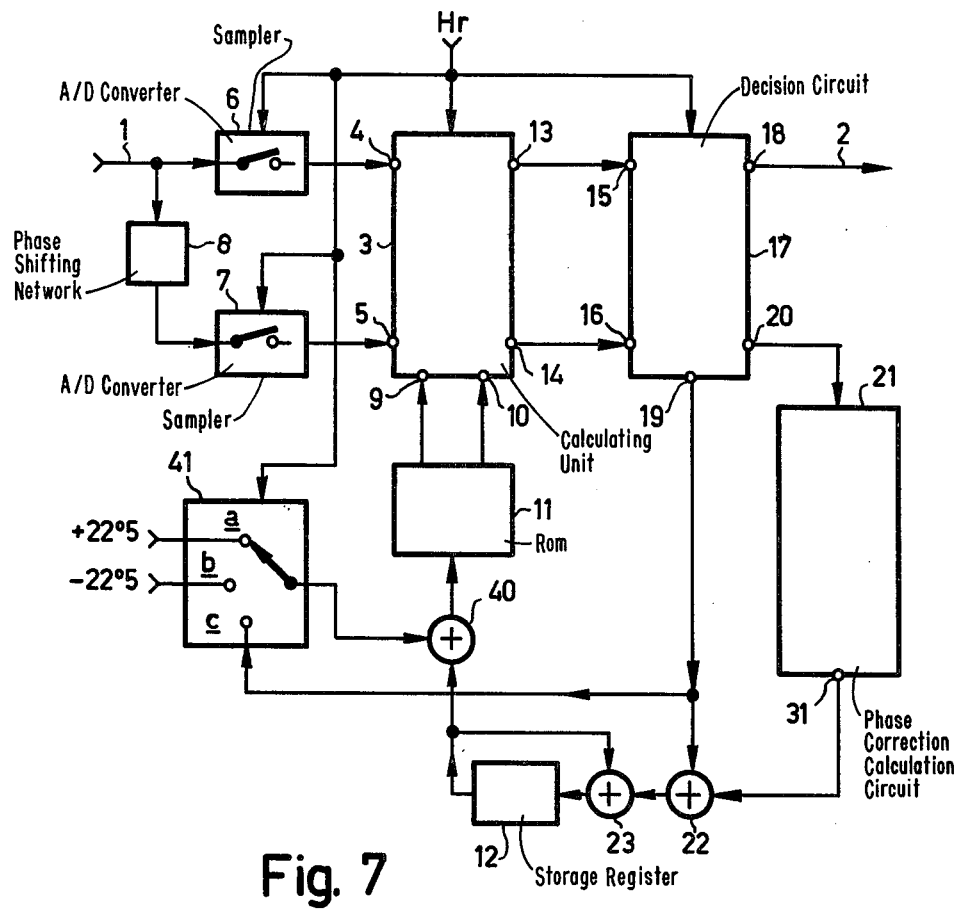
Figure 8:
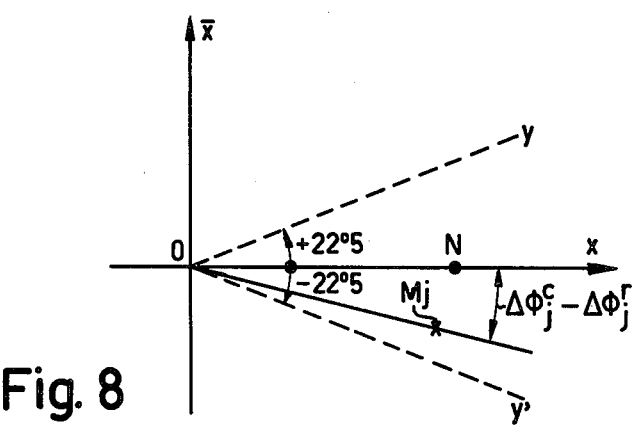
Figure 9:
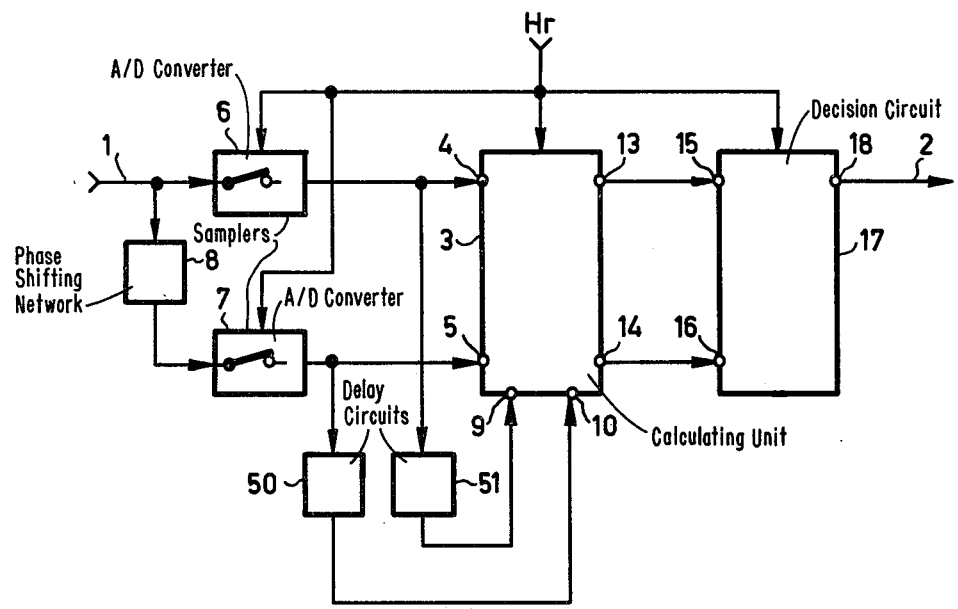
Figure 10:
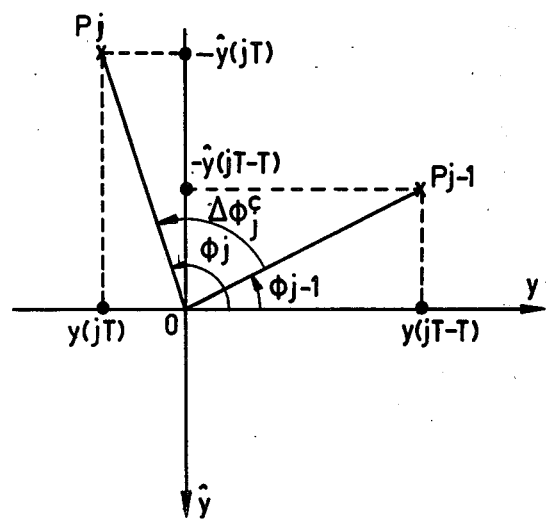
Figure 11:
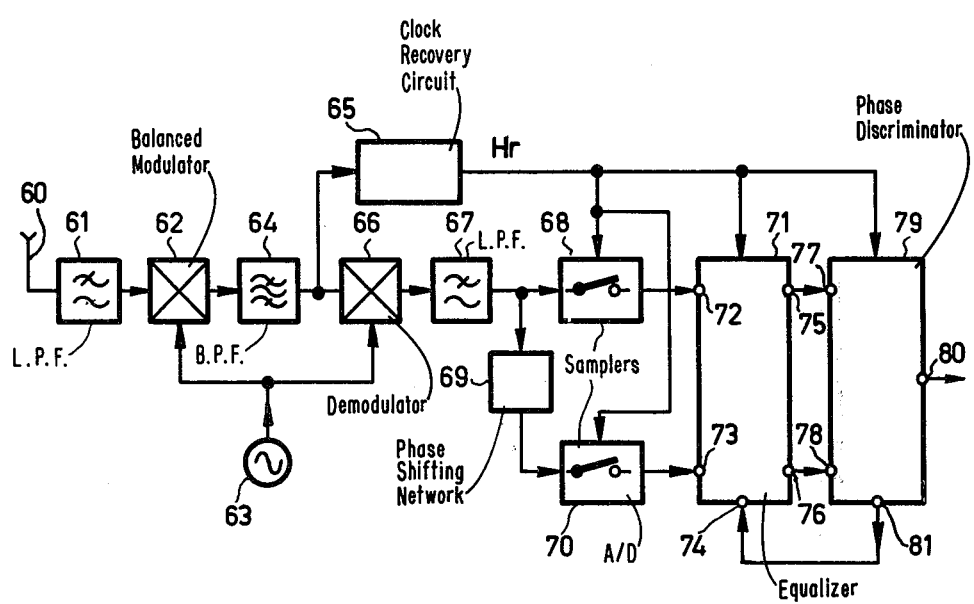

FIG. 1 shows the circuit diagram of a phase discriminator according to the invention of the coherent type, FIG. 2 shows a signal-space diagram of the signals applied to the unit for calculating the phase rotation in the phase discriminator of FIG. 1, FIG. 3 is a signal-space diagram which in particular represents the image of the signal applied to the decision circuit, FIG. 4 is a signal-space diagram to explain the operation of the decision circuit, FIG. 5 and FIG. 6 are signal-space diagrams to explain the simplified reproduction of the phase jumps in the decision circuit, if use is made of a variant of the phase discriminator of FIG. 1 whose circuit diagram is shown in FIG. 7, FIG. 8 is a signal-space diagram to explain the simplified processing of the error signal by the decision circuit in the phase discriminator of FIG. 7, FIG. 9 shows a circuit diagram of a phase discriminator according to the invention of the differential type, FIG. 10 is a signal-space diagram of the signals applied to the unit for calculating the phase rotation in the phase discriminator of FIG. 9, FIG. 11 shows the circuit diagram of a receiver which utilizes the phase discriminator according to the invention.

The phase discriminator shown in FIG. 1 is intended for use in a receiver of a system for data transmission by means of phase modulation of a carrier. This discriminator is, for example, suitable for a data transmission system using a standardized 4800 bits/s modem. This example will be described hereinafter in a more general manner. It is known that in the transmitter section of this modem the data to be transmitted are grouped into 3-bit groups which may assume eight configurations and these 3-bit groups are transmitted at a rate of 1600 Baud in the form of phase jumps of a 1800 Hz carrier, these phase jumps being multiples of 45° from 0° to 315°.

The signal at the phase discriminator input, present on lead, 1, corresponds to the transmitted passband signal and is restricted to the 600-3000 Hz band located on either side of the carrier frequency and corresponding to the bandwidth of the transmission channel. It is now assumed that this discriminator input signal is distortion-free which, in general is obtained by means of a manual or automatic equalizer, not shown in FIG. 1, which is connected in series with lead 1. Starting from such a signal the phase discriminator must reproduce at its output lead 2 the transmitted phase jumps.

It is one of the objects to provide a fully digital phase discriminator in which all circuits operate with a minimum speed of calculation.

To that end this phase discriminator in FIG. 1 comprises a calculating unit 3 which is arranged for receiving digital signals whose signal samples occur at a rate $H_r$ equal to the data modulation rate. The digital signals at the first pair of input terminals, 4 and 5, of calculating unit 3 are representative of the in-phase and quadrature components of the received passband signal and are supplied by the analog-to-digital converters 6 and 7 respectively, whose sampling circuits are controlled by a local clock frequency $H_r$. Converter 6 directly receives the passband signal which is present on lead 1 and converter 7 receives the passband signal which is shifted in phase over 90° by a phase shifting network 8. The sampling frequency $H_r$, which is equal to 1600 Hz in the case of the 4800 bits/s modem, is supplied by a circuit for recovering the clock frequency, not shown in FIG. 1; the manner in which this clock recovery circuit may be connected will be indicated in a circuit diagram of the receiver to be described hereinafter.

The digital signals at the second pair of input terminals, 9 and 10, of calculating unit 3 are derived from a ROM-memory 11 and are representative of the in-phase and quadrature components of a local reference carrier whose phase is controlled by means which will be described hereinafter. The phase of this local reference carrier is available in digital form (at a sample rate $H_r$) at the output of a phase generator 12 which is constituted by a storage register and this phase is used as an address for ROM-memory 11 in which different values of the in-phase and quadrature components are stored at different addresses.

At each sampling instant jT determined by the clock, frequency, $H_r$, where j is an integer and T is equal to $1/H_r$, calculating unit 3 calculates the signal samples of digital signals which are representative of the in phase and quadrature components of a signal derived from the received passband signal by a phase rotation over an angle which is equal and opposite to the phase of the local reference carrier at the preceding sampling instant $(j-1)T$. The signals available at output terminals 13, 14 of calculating unit 3 are applied to input terminals 15, 16 of a decision circuit 17.

From the signals at its input this decision circuit 17 derives at each sampling instant jT (determined by the clock frequency $H_r$) the phase jump of the transmitted carrier corresponding to the data modulation, this phase jump being available at an output 18 which is connected to output lead 2 of the phase discriminator. Decision circuit 17 also determines at each sampling instant jT the phase variation of the transmitted carrier between sampling instants jT and $(j-1)T$, this phase variation being available at an output 19. This phase variation is nothing else but the transmitted phase jump increased by a constant amount which is equal to the phase variation of the non-modulated carrier.

Finally, decision circuit 17 in FIG. 1 comprises means for forming at each sampling instant jT an error signal which is representative of the difference between the phase of the signal whose components are available at inputs 15, 16, and the phase variation available at output 19. This error signal is available at an output 20 of decision circuit 17 and is applied to the input of a circuit 21 for calculating the phase correction. This circuit 21 is included in a phaselock loop for controlling the local reference carrier phase supplied by storage register 12. This loop also comprises an adder 22 which supplies at each sampling instant jT the sum of the phase correction available at an output 31 of circuit 21 and the phase variation available at output 19 of decision circuit 17. In addition, an adder 23 supplies at each sampling instant jT the sum of the amount supplied by adder 22 and the phase stored in storage register 12 corresponding to the phase of the reference carrier at the preceding sampling instant $(j-1)T$.

Circuit 21 for calculating the phase correction comprises two branches 24 and 25, whose inputs are interconnected and connected to output 20 of decision circuit 17 and whose outputs are connected to the inputs of an adder 26 which supplies the phase correction. Branch 24 only comprises a multiplier 27 having a coefficient $\alpha$. Branch 25 comprises, in this sequence, a multiplier 28 having a coefficient $\beta$, an adder 29 whose inputs are connected to the output of multiplier 28 and to the output of a storage register 30. The input of this last-mentioned register 30 is connected to the output of adder 29.

A description of the operation of the various elements which constitute the phase discriminator of FIG. 1 follows below.

The operation of calculating unit 3 will be explained by means of the signal-space diagram of FIG. 2. The composition of this diagram is based on the general form of a phase-modulated alternating current signal. Thus, the passband signal y(t) at input 1 of the phase discriminator has the form:

$$y(t) = \rho \cos \phi(t)$$

where $\rho$ is the amplitude and $\phi(t)$ the phase which varies with the time. The passband signal shifted over 90° by phase shifting network 8 is called $\hat{y}(t)$ and has the form:

$$y(t) = \rho \cos [\phi(t) + \pi/2] = -\rho \sin \phi(t)$$

In the diagram of FIG. 2, a first point $P_j$, which is an image of the passband signal y(t) at the sampling instant jT, is drawn in a plane of coordinates yOŷ. This point $P_j$ is characterized by the length $\overrightarrow{OP_j}$, which is equal to the modulus $\rho_j$ of the passband signal, and by the angle $(\overrightarrow{Oy}.\overrightarrow{OP_j})$, which is equal to the phase $\phi_j$ of this signal at the sampling instant jT. This point $P_j$ may also be characterized by its abscissa and ordinate which are given by respectively:

$$\begin{cases} \rho_j \cos \phi_j = y(jT) \\ \rho_j \sin \phi_j = -\hat{y}(jT) \end{cases} \quad (1)$$

According to the above explanation the quantities y(jT) and ŷ(jT) are the values of the in-phase and quadrature components of the passband signal which are applied to inputs 4 and 5 of calculating unit 3 at sampling instant jT.

The diagram of FIG. 2 also shows a point $p_{j-1}{}^r$ which is an image of the local reference carrier whose phase is supplied by storage register 12 at the preceding sampling instant $(j-1)T$. This point $P_{j-1}{}^r$ too is drawn so that the length $\overrightarrow{OP_{j-1}{}^r}$ is equal to the amplitude of the local reference carrier and the angle $(\vec{Oy}.\vec{OP}_{j-1}{}^r)$ is equal to the phase $\phi_{j-1}{}^r$ of this carrier at the sampling instant (j−1)T. By assuming that the amplitude of the local reference carrier is constant and equal to 1 the abscissa and the ordinate of the point $P_{j-1}{}^r$ are given by respectively:

$$\begin{cases} \cos \phi^r_{j-1} = y^r(jT-T) \\ \sin \phi^r_{j-1} = -\hat{y}^r(jT-T) \end{cases} \quad (2)$$

The quantities $y^r(jT-T)$ and $\hat{y}^r(jT-T)$ are the values of the in-phase and quadrature components of the local reference carrier which are applied to inputs 9 and 10 of calculating unit 3. To obtain these components $y^r(jT-T)$ and $\hat{y}^r(jT-T)$ the various values of the functions $\cos \phi_{j-1}{}^r$ and $\sin \phi_{j-1}{}^r$ are stored in ROM-memory 11 and in response to each value $\phi_{j-1}{}^r$ supplied at its input by local reference carrier phase generator 12 this ROM-memory supplies the values of the in-phase and quadrature components of the local reference carrier.

Finally, as shown in FIG. 2 the angle $(\vec{OP}_{j-1}{}^r. \vec{OP}_j)$ is the difference between the phase $\phi_j$ of the received passband signal at the instant jT and the phase $\phi_{j-1}{}^r$ of the local reference carrier at the instant (j−1)T. This phase difference $\Delta\phi_j{}^c = \phi_j - \phi_{j-1}{}^r$ constitutes a measure for the phase variation of the received carrier between the instants (j−1)T and jT where the phase $\phi_{j-1}{}^r$ of the local carrier is used as reference phase which, as will be proved hereinafter, is accurately stabilized at the carrier phase of the received signal.

The function of calculating unit 3 consists of rotating at each sampling instant jT the phase of the passband signal with image $P_j$ over an angle which is equal and opposite to the phase $\phi_{j-1}{}^r$ of the local carrier with image $P_{j-1}{}^r$ at sampling instant (j−1)T. It will be readily understood that the above-mentioned phase difference $\Delta\phi_j{}^c$ appears as the phase of the passband signal whose phase has been rotated over an angle $-\phi_{j-1}{}^r - \phi_{j-1}{}^r$. This is the same as saying that the phase difference $\Delta\phi_j{}^c$ is the phase of the passband signal in a reference system in which the reference phase is the phase $\phi_{j-1}{}^r$ of the local carrier at the instant (j−1)T.

The diagram of FIG. 3 shows the result of the conversion performed by calculating unit 3 in a rectangular system of co-ordinates xOx̄ in which Ox is the phase reference axis and Ox̄ is derived from Ox by a 90° rotation. The point $M_j$ is the image of the passband signal which has been subjected to a phase rotation over $-\phi_{j-1}{}^r$. This point is characterized by the amplitude $\rho_j$ of the passband signal and a phase equal to $\Delta\phi_j{}^c$. It is also characterized by its coordinates $x(jT)$ and $\bar{x}(jT)$ which can be expressed by the following equations:

$$\begin{cases} x(jT) = \rho_j \cos \Delta\phi_j{}^c = \rho_j \cos (\phi_j - \phi^r_{j-1}) \\ \bar{x}(jT) = \rho_j \sin \Delta\phi_j{}^c = \rho_j \sin(\phi_j - \phi^r_{j-1}) \end{cases} \quad (3)$$

Calculating unit 3 calculates the components which correspond to the coordinates $x(jT)$ and $\bar{x}(jT)$, starting unambiguously from the components $y(jT)$ and $\hat{y}(jT)$ of the passband signal at the instant jT and from the components $y^r(jT-T)$ and $\hat{y}^r(jT-T)$ of the local reference carrier at the instant (j−1)T.

By elaborating the above-mentioned relations (3) and by using the relations (1) and (2) it can be proved that the components $x(jT)$ and $\bar{x}(jT)$ may be written as:

$$\begin{cases} x(jT) = y(jT) \cdot y^r(jT - T) + \hat{y}(jT) \cdot \hat{y}^r(jT - T) \\ \bar{x}(jT) = y(jT) \cdot \hat{y}^r(jT - T) - \hat{y}(jT) \cdot y^r(jT - T) \end{cases} \quad (4)$$

These relations (4) fully define the calculations which must be performed in calculating unit 3 to enable it to supply the components $x(jT)$ and $\bar{x}(jT)$ at its outputs 13, 14. These calculations can be performed by means of multiplying circuits which form the four products in the relation (4) and of combining circuits for forming a sum of products in accordance with the first relation (4) and a difference of products in accordance with the second relation (4). Those skilled in the art will readily understand that it is not necessary to describe these circuits and their arrangement in detail.

The part played by logic decision circuit 17 consists in the first place in reproducing the transmitted phase jumps starting from the components $x(jT)$ and $\bar{x}(jT)$ supplied by calculating unit 3. In the example of the 4800 bits/s modem the transmitted phase jumps are multiples of 45°, whereas the own phase variation of the non-modulated, transmitted carrier, having a frequency of 1800 Hz, amounts to 45° between two successive sampling instants separated by the interval T=1/1600 Hz. The corresponding phase variations $\Delta\phi_j{}^r$ of the transmitted carrier which is modulated by the phase jumps $SP_j$ then are:

$$\Delta\phi_j{}^r = SP_j + 45°. \quad (5)$$

To explain the operation of this decision circuit FIG. 4 shows in the coordinate plane xOx̄ eight points $N_1, \ldots, N_8$ which correspond to eight possible phase variations $\Delta\phi_j{}^r$ of the transmitted carrier. These phase variations $\Delta\phi_j{}^r$ are multiples of 45° and the points $N_1, \ldots, N_8$ are located on the coordinate axes Ox, Ox̄ or on the straight lines $\Delta_1, \Delta_2$ at an angle of 45° with respect to these axes. On the other hand the straight lines $D_1, D_2, D_3, D_4$ which are bisectors of the 45° angles formed by Ox, $\Delta_1$, Ox̄, $\Delta_2$ divide the plane into 8 sectors $Z_1, \ldots, Z_8$, which will be called the decision zones hereinafter. A point $M_j$ with coordinates $x(jT), \bar{x}(jT)$ which corresponds to a phase variation $\Delta\phi_j{}^c$ of the carrier on receipt will be located in one of the decision zones and it will be clear that, depending on the zone to which the point $M_j$ belongs, the phase variation $\Delta\phi_j{}^r$ of the transmitted carrier and the transmitted phase jump $SP_j$ can be derived therefrom. The following table I shows the relation between the decision zones, the transmitted phase variations $\Delta\phi_j{}^r$ and the transmitted phase jumps $SP_j$ which are derived therefrom in accordance with formula (5).

TABLE I

| Decision zones | Phase variation $\phi_j{}^r$ (in degrees) | Phase jumps $SP_j$ (in degrees) |
| --- | --- | --- |
| $Z_1$ | 0 | 315 |
| $Z_2$ | 45 | 0 |
| $Z_3$ | 90 | 45 |
| $Z_4$ | 135 | 90 |
| $Z_5$ | 180 | 135 |
| $Z_6$ | 225 | 180 |
| $Z_7$ | 270 | 225 |
| $Z_8$ | 315 | 270 |

To assign one of the decision zones $Z_1, \ldots, Z_8$ to each point $M_j$ it suffices to ascertain whether this point $M_j$ is situated above or below the various straight lines $D_1$, $D_2$, $D_3$ and $D_4$. As the co-ordinates x and $\bar{x}$ of points on these straight lines $D_1$, $D_2$, $D_3$, $D_4$ are related by the equations $\bar{x} - mx = 0$, $m\bar{x} - x = 0$, $m\bar{x} + x = 0$, $\bar{x} + mX = 0$, respectively, where $m = \tan 22°5$, it can be readily derived that the sign of the four quantities $\bar{x}(jT) - mx(jT)$, $x(jT) + m\bar{x}(jT)$, $x(jT) - m\bar{x}(jT)$, $\bar{x}(jT) + mx(jT)$ renders it possible to determine the relation between a point $M_j$ having the coordinates $x(jT)$ and $\bar{x}(jT)$ and one of the decision zones $Z_1, \ldots, Z_8$, in accordance with the following table II (The symbol * indicates that the relevant sign is of no importance)

TABLE II

| Sign of $\bar{x}(jT) - mx(jT)$ | sign of $x(jT) + m\bar{x}(jT)$ | sign of $x(jT) - m\bar{x}(jT)$ | sign of $\bar{x}(jT) + mx(jT)$ | Decision zone |
|---|---|---|---|---|
| + | + | + | * | $Z_2$ |
| + | + | − | * | $Z_3$ |
| + | − | * | + | $Z_4$ |
| + | − | * | − | $Z_5$ |
| − | + | * | * | $Z_1$ |
| − | + | * | − | $Z_8$ |
| − | − | + | * | $Z_7$ |
| − | − | − | * | $Z_6$ |

So decision circuit 17 comprises calculating circuits which starting from the numbers $x(jT)$ and $\bar{x}(jT)$ at its inputs calculate the four above-mentioned quantities, and furthermore a logic assembly to which four logic variables consisting of the sign of these quantities are supplied, this logic assembly being arranged in the usual manner for indicating the decision zones $Z_1, \ldots, Z_8$ in accordance with table II. As, in accordance with table I, each decision zone is associated with a phase jump, this logic assembly supplies at output 18 of decision circuit 17 the transmitted phase jumps $SP_j$ and so the transmitted data. The phase variations of the transmitted carrier $\Delta\phi_j^t$ are available at output 19 of decision circuit 17 and are used for generating the phase of the local reference carrier as will be described hereinafter.

Everything which has been said so for about the operation of the calculating unit and the decision circuit in the example of eight-phase modulation can be applied without any trouble to other phase modulation methods. For example, in the case of four-phase modulation in which the phase jumps are multiples of 90°, a signal diagram can be formed analogous to that of FIG. 4, but now having four decision zones which are centered on the coordinate axes Ox, O$\bar{x}$ and which are bounded by two straight lines at an angle of 45° with respect to these axes. To assign one of these four zones to a point $M_j$ having as coordinates the components $x(jT)$, $\bar{x}(jT)$ supplied by the calculating unit, it is verified whether the point $M_j$ is above or below the two straight lines bounding the decision zones by forming two logic variables constituted by the sign of $[\bar{x}(jT) - mx(jT)]$ and of $[\bar{x}(jT) + mx(jT)]$, where m is equal to tan 45°.

In the general case of p-phase modulation, where the phase variations corresponding to the transmitted data are multiples of $2\pi/p$ going from 0 to $(p-1)2\pi/p$, the signal diagram comprises (analogous to that of FIG. 4) p decision zones which consist of equal sectors which are centered on these multiples. These decision zones are bounded by p straight lines and p/2 logic variables are formed in the decision circuit for verifying whether a point $M_j$ having coordinates $x(jT)$ and $\bar{x}(jT)$ is above or below these straight lines and thus for assigning a decision zone to a point $M_j$.

The phase control of the local reference carrier is based on the following principle which will be explained by means of the diagram of FIG. 2. As mentioned above, the point $P_{j-1}^r$ already shown in this diagram is an image of the local reference carrier at the instant $(j-1)T$ which carrier is assumed to have been fully stabilized on the received carrier. Besides that also the point $P_j$ is shown which is the image of the passband signal at the instant jT. As the received passband signal may have been affected by noise and frequency offset, the phase difference 66 $\phi_j^c$ between the signals represented by these two points differs from the phase variation of the transmitted carrier $\Delta\phi_j^t$ such as the latter is represented by decision circuit 17.

In the diagram of FIG. 2 a point $p'_j^r$ is construed which corresponds to a passband signal without noise and without frequency offset and which consequently is derived from the point $P_{j-1}^r$ by rotating its phase over an angle equal to the phase variation $\Delta\phi_j^t$ of the transmitted carrier. Without noise and frequency offset the phase of the local reference carrier would be the phase which corresponds to this point $p'_j^r$, for example $\phi_{j-1}^r + \Delta\phi_j^t$. Between the signals represented by the point $P_j$ and the point $P'_j^r$ there is a phase difference which can be written as $\Delta\phi_j^c - \Delta\phi_j^t$ and which will be called phase error hereinafter. This phase error is characteristic of the noise and the frequency offset introduced by the transmission path. To stabilize the phase of the local reference carrier on the phase of the received carrier which is represented by the point $P_j$, a phase correction $\delta\phi$ must be added to the phase of the signal represented by the point $P_j$, this phase correction being calculated from said phase error.

So in the diagram of FIG. 2 a point $P_j^r$ is construed which is representative of the phase-stabilized local reference carrier and in accordance with the proceding explanation the phase $\phi_j^r$ of this local carrier is given by the expression:

$$\phi_j^r = \phi_{j-1}^r + \Delta\phi_j^t + \delta\phi \qquad (6)$$

It is obvious that after the stabilizing action has been fully realized the points $P_j$ and $P_j^r$ coincide.

From FIG. 1 it appears that the phase of the local reference carrier in storage register 12 is obtained in accordance with this formula (6). Adder 22 supplies at each sampling instant jT the sum of the phase variation $\Delta\phi_j^t$ which is available at an output 19 of decision circuit 17 and the phase correction $\delta\phi$ which is available at output 31 of circuit 21. This sum $\Delta\phi_j^t + \delta\phi$ is applied to an input of adder 23 whose other input receives the phase $\phi_{j-1}^r$ originating from storage register 12. So at the output of adder 23 the phase $\phi_j^r$ is formed in accordance with formula (6) and this phase is stored in storage resistor 12 for use at the next sampling instant $(j+1)T$.

The phase correction $\delta\phi$ is calculated in circuit 21 starting from an error signal $e_j$ which is supplied by decision circuit 17 and which is characteristic of the phase error $\Delta\phi_j^c - \Delta\phi_j'$. First it will be explained in which form this error signal $e_j$ can be obtained in decision circuit 17 as a function of the components x(jT) and $\bar{x}$(jT) at its input.

To this end use is made of the above-described relation between the diagrams of FIG. 2 and FIG. 3. In the diagram of FIG. 3 a point $M_j$ has already been construed which has the coordinates x(jT) and $\bar{x}$(jT) corresponding to the point $P_j$ in FIG. 2; the point $M_j$ is the image of the passband signal received at the instant jT in a reference system in which the reference phase is the phase of the local reference carrier at the instant (j−1)T; in this system the phase of the signal which corresponds to the point $M_j$ is $\Delta\phi_j^c$. In the diagram of FIG. 3 a point $M'_j$ is now construed which corresponds to the point $P'_j$ in the diagram of FIG. 2 and it will be readily seen that the phase which corresponds to this point $M'_j$ is the plase variation $\Delta\phi_j'$ of the transmitted carrier; in the example of the 4800 bits/s modem this phase variation $\Delta\phi_j'$ is a multiple of 45° and equal to 90° in FIG. 3. The magnitude and sign of the phase error $\Delta\phi_j^c - \Delta\phi_j'$ might be accurately characterized by the magnitude and the sense of the vector $\overline{M_jM'_j}$ and these characteristics of the vector $\overline{M_jM'_j}$ might be calculated as a function of the components x(jT) and $\bar{x}$(jT) to obtain the error signal $e_j$.

In actual practice, by means of a much simpler methd an error signal $e_j$ can be obtained which characterizes the magnitude and sign of the phase error sufficiently closely for practical purposes. This method is preferably used in decision circuit 17 and will now be explained with reference to the diagram of FIG. 4. In this diagram which has already been described before, the various points $N_1, \ldots, N_8$ are nothing else but the eight possible points $M'_j$ of FIG. 3. For example, in the diagram of FIG. 4 a point $M_j$ is shown which is situated in decision zone $Z_1$. It will be readily seen that in this zone $Z_1$ the magnitude and the sense of the phase error $\Delta\phi_j^c - \Delta\phi_j'$ can be pproximated sufficiently closely by the algebraic value of the ordinate x(jT) of the point $M_j$. If the point $M_j$ is situated in zone $Z_2$ it will be readily seen that an approximation of the phase error is given by the algebraic value of the quantity $\bar{x}$(jT)−x(jT). It can be readily ascertained that for the other decision zones a proper approximation of the phase error is given by the algebraic values of $\pm\bar{x}$(jT), $\pm$x(jT) or a simple combination of these values in accordance with the following table III.

TABLE III

| Decision zone | Approximation of the phase errors $e_j$ |
| --- | --- |
| $Z_1$ | $\bar{x}$(jT) |
| $Z_2$ | $\bar{x}$(jT) − x(jT) |
| $Z_3$ | −(jT) |
| $Z_4$ | − [x(jT) + $\bar{x}$(jT)] |
| $Z_5$ | −$\bar{x}$(jT) |
| $Z_6$ | − [$\bar{x}$(jT) − x(jT)] |
| $Z_7$ | x(jT) |
| $Z_8$ | x(jT) + $\bar{x}$(jT) |

The decision circuit 17 which, as described above, supplies the phase variations $\Delta\phi_j'$ and the phase jumps $SP_j$ in accordance with the decision zones, supplies simultaneously at its output 20 an error signal $e_j$ assuming the various forms of table III as a function of the decision zones. These various forms can be obtained in a very simple manner as a function of the magnitudes x(jT) and $\bar{x}$(jT) supplied to the inputs of the decision circuit and it is not necessary to describe the corresponding circuits.

Starting from the error signal supplied in digital form by the decision circuit, circuit 21 calculates a phase correction $\delta\phi$ which is the sum of the terms supplied by the branches 24 and 25.

Branch 24 supplies a phase correction term $\delta\phi1$ which is proportional to the error signal $e_j$ at the instant jT with an adjustable proportionality coefficient $\alpha \leq 1$.

Branch 25 supplies a phase correction term $\delta\phi2$ which results from the error signal $e_{j-1}$ at sampling instant (j−1)T (thanks to storage register 30 which is connected to adder 29), this error signal $e_{j-1}$ being weighted by an adjustable coefficient $\beta \leq 1$. This shows that by means of branch 25 it is possible to obtain at the instant jT a phase correction term $\delta\phi_2$ which is not equal to zero, even if at that instant jT the error signal $e_j$ itself is equal to zero. This correction term $\delta\phi_2$ is required for stabilizing the local reference carrier phase when the received carrier is subject to frequency offset with respect to a transmitted carrier, if it is desirable to keep the error signal $e_j$ equal to zero and so, as regards noise, to have a similar performance as that in the case of a frequency offset equal to zero.

The adjustable coefficients $\alpha$ and $\beta$ correspond to a fittering of the error signal and determine the acquisition rate of the local reference carrier phase.

The stabilization of the local reference carrier, as described above, is particularly effective, especially as regards the possible acquisition rate of the proper phase, for this stabilization is controlled by an error signal $e_j$ whose amplitude greatly depends on the magnitude of the phase error, which enables performing phase corrections $\delta\phi$ with a variable amplitude depending on the value of the phase error to be corrected. Another, less effective control system can be arranged in such a way that the error signal is simply a logic signal which characterizes the sign of the phase error. Such an error signal can be obtained starting from the sign of the quantities shown in the second column of table III. Such a control system has the drawback that in principle phase corrections $\delta\phi$ with a constant amplitude are supplied and difficulties may arise when at the same time a proper stabilization and a short acquisition time must be realized.

So the phase discriminator described is essentially a digital discriminator and exclusively processes the signal values at the sampling instants. The frequency of the calculations in all circuits is equal to the data modulation rate and so at a minimum. In the form described, the discriminator is of the coherent type because for reproducing the transmitted phase jumps the phase $\phi_j$ of the signal received at the instant jT is compared with the phase $\phi_{j-1}^r$ of a local reference carrier at the preceding instant (j−1)T, which carrier is stabilized in phase on the carrier received. Thanks to this phase stabilization the phase $\phi_{j-1}^r$ is substantially not affected by noise so that the comparison is only affected by that noise which can affect the phase $\phi_j$ of the received passband signal.

Hereinafter various improvements will be described which can be made in the phase discriminator according to the invention and which have for their object to provide a further simplification of the processes to be performed in decision circuit 17.

A first improvement enables a simplification of those operations that are performed for deciding on the coherence of each point $M_j$ defined by the components x(jT) and x̄(jT) with one of the decision zones $Z_1, \ldots, Z_8$ to derive therefrom the transmitted phase variations $\Delta\phi_j'$ and phase jumps $SP_j$. The processes to be performed are indicated above by means of table II derived from the diagram of FIG. 4. These processes necessitate the processing of four logic variables which are indicated in the headings of the columns of table II and in each of which the components x(jT), x̄(jT) and the constant m=tan 22° 5 occur. The comparative complexity of these four logic variables results from the fact that the decision zones were bounded by straight lines $D_1$, $D_2$, $D_3$ and $D_4$ forming an angle equal to 22° 5 with the axes Ox or Ox̄. The underlying principle of the present improvement consists of the use of decision zones bounded by simpler straight lines which are constituted by the co-ordinate axes Ox, Ox̄ and the bisectors $\Delta_1$, $\Delta_2$ of the 90° angles formed by these axes.

This first improvement is shown in FIG. 7 in which the essential elements of the phase discriminator bear the same reference numerals as those in FIG. 1. In addition, the discriminator of FIG. 7 comprises an adder 40, an input of which receives, at each sampling instant jT, the phase $\phi_{j-1}'$ of the local reference carrier originating from the storage register 12 and the other input of which receives via a switching circuit 41 (which, for the sake of simplicity, is shown in the form of contacts) either the phase +22° 5 or the phase −22° 5 depending on whether this switch is in the position a or in the position b. For the moment it is assumed that switch 41 has only these two positions. After each sampling instant jT the switching circuit 41 is so controlled by clock frequency signal $II_r$ that the positions a and b are successively occupied, whereby in each period jT, (j+1)T ROM-memory 11 receives, in this order, the phases $\phi_{j-1}'+22°\ 5$ and $\phi_{j-1}'-22°\ 5$.

From this it follows that instead of having the phase of the received passband signal represented by $P_j$ in FIG. 2 rotate over an angle equal to $-\phi_{j-1}'$, the calculating unit 3 acting as phase rotation circuit causes this phase to rotate first over an angle equal to $-\phi_{j-1}'-22°\ 5$, and thereafter over an angle equal to $-\phi_{j-1}'+22°\ 5$. From this it will be readily seen that in the diagram of FIG. 3 the points $M_j$ and $M_j'$ rotate in both these situations over angles which are equal to −22° 5 and +22° 5, whereas in the diagram of FIG. 4 the points $M_j$, $N_1$, ..., $N_8$ and the straight lines $D_1$, $D_2$, $D_3$, $D_4$ defining the decision zones $Z_1, \ldots, Z_8$ also rotate over angles of −22° 5 and +22° 5.

Finally, the diagrams of FIG. 5 and FIG. 6 show the positions of these points, straight lines, and decision zones, when ROM-memory 11 receives in addition to the phase $\phi_{j-1}'$ also the extra phases +22° 5 and −22° 5, respectively. In FIG. 5 the decision zones are rotated over an angle of −22° C. with respect to FIG. 4 and in FIG. 6 they are rotated over an angle of +22° 5 with respect to FIG. 4. The coordinates of the point $M_j$, which is also rotated over angles of −22° 5 and +22° 5 represent the values of the components x(jT) and x̄(jT) supplied to decision circuit 17.

It now becomes very simple to decide on the relation between the point $M_j$ and one of the decision zones $Z_1, \ldots, Z_8$ by means of two logic variables only which are formed by the sign of x(jT) and the sign of x̄(jT) respectively. This is shown in Table IV which can be readily verified by means of the FIG. 5 and FIG. 6.

TABLE IV

| +22°5 | | −22°5 | | |
|---|---|---|---|---|
| sign of x(jT) | sign of x̄(jT) | sign of x(jT) | sign of x̄(jT) | decision zone |
| + | − | + | + | $Z_1$ |
| + | + | + | + | $Z_2$ |
| + | + | − | + | $Z_3$ |
| − | + | − | + | $Z_4$ |
| − | + | − | − | $Z_5$ |
| − | − | − | − | $Z_6$ |
| − | − | + | − | $Z_7$ |
| + | − | + | − | $Z_8$ |

The first two columns show the values of these two logic variables when an extra phase of +22° 5 is applied to ROM-memory 11 (FIG. 5); the third and fourth column show the values of the two logic variables when an extra phase of −22° 5 is applied (FIG. 6). The fifth column shows the decision zones which correspond to the values of the two logic variables shown in the preceding columns.

The decision circuit which uses the result of table IV now become extremely simple. It is sufficient to store in a memory the sign which the two components at the input of the decision circuit assume for the two positions a and b of switch 41, to assign a decision zone to the signal received and to reproduce the phase variations and the phase jumps of the transmitted carrier in accordance with table I.

This improvement may be used without objections in the case of p-phase modulation; in that case the additional phases which must be successively added to the phase of the local reference carrier amount to $(2k+1)\pi/p$, where k is an integer varying between $-(p/8-1)$ and p/8.

A further improvement based on a similar notion enables the omission of a separate operation to be performed in decision circuit 17 for obtaining the error signal $e_j$, whereas simultaneously an error signal is obtained which represents the phase error more accurately. These operations to be performed have so far been defined by means of table III which shows that the error signal $e_j$ is calculated in a manner which is different for each decision zone. In addition, by means of the diagram of FIG. 4 it can be verified that the error signal $e_j$, calculated in accordance with table III, represents the phase error in the zones $Z_1$, $Z_3$, $Z_5$, $Z_7$ in a better manner than in the zones $Z_2$, $Z_4$, $Z_6$, $Z_8$.

The present improvement, which may be used simultaneously with the first-mentioned improvement, consists according to FIG. 7 in extending switching circuit 41 with a third position c, the switching contact which corresponds to this third position being connected to output 19 of decision circuit 17 for receiving the phase variations $\Delta\phi_j'$ of the transmitted carrier. Now switching circuit 41 is controlled after each sampling instant jT such that, in each period (jT,(j+1)T) the positions a, b and c are occupied successively. The positions a and b are again used for reproducing the phase variation and the phase jump of the transmitted carrier.

When switch 41 is in the position c, the phase $\phi_{j-1}'+\Delta\phi_j'$ is applied to ROM-memory 11. Calculating unit 3 acting as a phase rotating circuit now causes the phase of the received passband signal (represented by $P_j$) in FIG. 2 to rotate over an angle which is equal to $-(\phi_{j-1}'+\Delta\phi_j')$. As a result, the diagram of FIG. 3 is converted into the diagram of FIG. 8. The point $M_j'$ and the points $N_1, \ldots, N_8$ characterized by the phase $\Delta\phi_j^r$ in FIG. 3 and FIG. 4 are at always situated on the semi axis Ox after this additional phase rotation over $-\Delta\phi_j^r$. The common position of these points is indicated by the point N in the diagram of FIG. 8. After said additional phase rotation, the point $M_j$, which is characterized in FIG. 3 and FIG. 4 by the phase $\Delta\phi_j^c$, is always situated within a sector which is bounded by the semi-straights Oy, Oy' making the respective angles $+22°\,5$ and $-22°\,5$ to the semi-axis Ox. The phase error $\Delta\phi_j^c - \Delta\phi_j^r$ is defined in the diagram of FIG. 8 by the angle $(\overrightarrow{Ox}, \overrightarrow{OM_j})$. An excellent approximation of this phase error is given by the ordinate $\bar{x}(jT)$ of the point $M_j$ in the diagram of FIG. 8. During the period of time in which switch 41 is in position c the sought-after error signal $e_j$ is obtained by simply taking one of the components $\bar{x}(jT)$ supplied by calculating unit 3.

So for a phase discriminator of the coherent type has been described whose advantages as regards the signal-to-noise ratio are indicated above. By using the same calculating unit acting as a phase rotating circuit and the same decision circuit a phase discriminator of the differential type can be constructed which is simpler because no local reference carrier stabilized as to phase is used, but which, however, is more sensitive to noise.

FIG. 9 shows the circuit diagram of this differential phase discriminator, which diagram can be readily derived from that of the coherent phase discriminator of FIG. 1 by omitting the circuits which are required for locally generating the components of the reference carrier, whereas decision circuit 7 need no longer supply to outputs 19 and 20 the transmitted phase variations and error signal, respectively, which are required for stabilizing the phase of the locally generated reference carrier. The second pair of input terminal 9, 10 of calculating unit 3 (to which in FIG. 1 and FIG. 7 at each sampling instant jT were supplied the in-phase and quadrature components of the local reference carrier at the instant $(j-1)T$ in the differential phase discriminator of FIG. 9 now receive the in-phase and quadrature components of the received passband signal at the instant $(j-1)T$, which last-mentioned signal now acts as a reference carrier. This is effected by connecting these input terminals 9 and 10 to the outputs of analog-to-digital converters 6 and 7, respectively, by delay circuits 50 and 51 which each effect a delay equal to T.

In the diagram of FIG. 10 which is construed in the same manner as that of FIG. 2, the point $P_j$ is shown which is the image of the received passband signal at the instant jT and which again has the coordinates $y(jT)$ and $-\hat{y}(jT)$ and the phase $\phi_j$. In FIG. 10 the point $P_{j-1}$, on the contrary, replaces the point $p_{j-1}^r$ of FIG. 2; this point $P_{j-1}$ is the image of the received passband signal at the instant jT-T and has the coordinates $y(jT-T)$ and $-\hat{y}(jT-T)$ and the phase $\phi_{j-1}$.

Starting from the component $y(jT)$ and $\hat{y}(jT)$ at inputs 4 and 5 and from the component $y(jT-T)$ and $\hat{y}(jT-T)$ at inputs 9 and 10, the calculating unit 3 acting as a phase rotating circuit performs the same calculations as those which are defined by the relations in formula (4), of course after $y'(jT-T)$ and $\hat{y}'(jT-T)$ have been replaced by $y(jT-T)$ and $\hat{y}(jT-T)$.

The components $x(jT)$ and $\bar{x}(jT)$ supplied by calculating unit 3 define in the diagram of FIG. 3 or FIG. 4 a point $M_j$ and decision circuit 17 derives therefrom the phase variations and the transmitted phase jumps in the same manner as described for the coherent phase discriminator.

A drawback of this differential phase discriminator is in the fact that the phase $\phi_{j-1}$ corresponding to the point $P_{j-1}$ with which the phase $\phi_j$ corresponding to the point $P_j$ is compared at each instant jT, is affected by noise introduced by the transmission channel and for that matter also the phase $\phi_j$ itself. This causes, in comparison with the coherent phase discriminator, the components $x(jT)$ and $\bar{x}(jT)$ calculated by calculating unit 3 in FIG. 9 to be affected by twice the noise and so an increased risk of errors is created in the reproduction of phase jumps by decision circuit 17. So this differential phase discriminator should only be used when the signal-to-noise ratio of the received passband signal is sufficiently large.

The described phase discriminators are remarkably well-matched to a receiver in which an automatic and autoadaptive equalizer of the digital type is used for equalizing the passband signal applied to the phase discriminator. As will be shown with reference to FIG. 11, which represents the block diagram of such a receiver, a very economic and efficient structure is then obtained.

This receiver, for instance constituting part of a 4800 bits/s modem, comprises a lowpass filter 61 which is connected to a lead 60 and which performs a first superficial filtering of the passband signal received, whose average frequency is equal to 1800 Hz (the carrier frequency). A balanced modulator 62, fed by a frequency $F_o$ originating from a generator 63, transposes the signal thus obtained to a frequency band which is centered around the average frequency $F_o + 1800$ Hz. This modulator 62 is followed by a bandpass filter 64 which eliminates in particular the noise frequency components outside the band of the 600-3000 Hz. The output of filter 64 is connected to a prior art clock recovery circuit 65 which supplies a clock frequency $H_r = 1600$ Hz equal to the data modulation rate. The output of filter 64 is also connected to a demodulator 66 fed by the frequency $F_o$ of generator 63, which demodulator 66 performs a frequency transposition inverse to that of modulator 62. A lowpass filter 67 connected to the output of demodulator 66 supplies the passband signal in the base band of 600-3000 Hz.

The receiver described above is of the type in which the equalization of the transmission channel is performed by a digital equalizer which operates on the passband signal (passband equalizer), whereas the phase discriminator operates on the equalized passband signal. Use may be made of a digital passband equalizer as described in e.g. U.S. Pat. No. 4,035,725. The patent discloses that this equalizer uses signals representative of the in-phase and quadrature components of the passband signal as digital input signals; in addition, the phase variations of the carrier reproduced by a phase discriminator are used for calculating the modification of the coefficients of the two digital filters in this equalizer and these modifications should be performed only at a rate equal to the data modulation rate. Finally, this equalizer can supply directly, in digital form, the in-phase and quadrature components of the equalized passband signal, that is to say just those digital signals which are necessary for the phase discriminator described in the present patent application.

This results in the structure of the circuits in the receiver of FIG. 11 which, in base band, the passband signal provided by filter 67. This passband signal is applied on the one hand to an analog-to-digital converter 68 on the other hand to a 90° phase shifting network 69 followed by an analog-to-digital converter 70.

The sampling frequency in these converters is the clock frequency $H_r=1600$ Hz and these converters supply, in digital form, the in-phase and quadrature component of the passband signal which are applied to inputs 72, 73 of an equalizer 71. This equalizer 71 receives at its input 74 the carrier phase variations $\Delta\phi_f'$ reproduced by the phase discriminator. In equalizer 71 all calculating circuits operate at a frequency $H_r=1600$ Hz and the in-phase and quadrature components of the equalized passband signal are obtained with a sampling frequency of 1600 Hz at the outputs 75, 76 of this equalizer.

The components are applied directly to inputs 77 and 78 of a phase discriminator 79 of the type described in the present application, which inputs 77 and 78 correspond in an embodiment according to FIG. 1 to the inputs 4 and 5 of calculating unit 3. This phase discriminator 79 (which is either of the coherent or of the differential type) operates at the same calculating frequency $H_r=1600$ Hz as equalizer 71. At an output 80 phase discriminator 79 reproduces the phase jumps corresponding to the transmitted data and at an output 81 phase discriminator 79 supplies the phase variations of the transmitted carrier which are applied to an input 74 of equalizer 71.

In this manner a receiver is realized whose structure is both simple and efficient: only one single analog-to-digital conversion of the passband signal is performed; the frequency of the calculations in the equalizer and the phase discriminator is the same and the smallest possible, for this frequency is equal to the data modulation rate and this simplifies the realization of these digital circuits, especially if large-scale-integration is required. Finally, it should be noted that in FIG. 11 all of the analog filters are arranged in front of the equalizer which means that the equalizer can correct their deviations.

What is claimed is:

1. A phase discriminator for use in a receiver of a system for data transmission by means of phase modulation of a carrier, the phase discriminator comprising a pair of samplers each having input means for receiving digital passband signals and an output means for providing digital signals having samples which occur at a rate equal to the data modulation rate, said sampled digital signals being respectively representative of the in-phase and quadrature components of said received passband signal at each sampling instant; a calculating unit having a first pair of inputs coupled to said output means respectively, a second pair of input means for receiving respectively the in-phase and quadrature components of a reference carrier at the preceding sampling instant, and output means for providing the signal samples of digital signals which are representative of the in-phase and quadrature of a reference carrier at the preceding sampling instant, and output means for providing the signal samples of digital signals which are representative of the in-phase and quadrature components of a signal derived from the received passband signal by a phase rotation over an angle which is equal and opposite to the phase of the reference carrier at the preceding samping instant; a decision circuit having input means coupled to said calculating unit output means, a first output means for providing a signal reproducing a phase jump in accordance with each sampling instant the phase variation of the transmitted carrier during one sampling period, and a second output means for providing an error signal which is formed after the reproduction of each phase jump in the decision circuit means for characterizing the difference between the phase of the signal determined by the calculating unit and the phase variation of the transmitted carrier which corresponds to the phase jump reproduced by the decision circuit first output means; and a generator having an input coupled to said decision circuit second output and an output means coupled to said calculating unit second pair of input means for providing respectively said in phase and quadrature components of said reference carrier.

2. A phase discriminator as claimed in claim 1, wherein the calculating unit comprises multiplying circuit means for forming the product of the two in-phase components at said calculating unit inputs, the product of the two quadrature components at said calculating unit inputs, the product of the in-phase component of the passband signal and quadrature component of the reference carrier, and the product of the quadrature component of the passband signal and the in-phase component of the reference carrier, and combining circuits means for forming the sum of the two first recited products and the difference of the two last recited products, said sum and said difference comprising the signal samples of the two output signals of the calculating unit.

3. A phase discriminator as claimed in claim 1, for use in a receiver of a system for data transmission by means of p-phase modulation of a carrier in which the data are transmitted in the form of phase jumps of the value $k2\pi/p$, where k is an integer with $0\leq k\leq p-1$, wherein the decision circuit means comprises (a) calculating circuits for forming at each sampling instant the quantities, $$x\text{-tan }(\alpha+k'2\pi/p+\pi/p)x$$

where x and x are the output signals of the calculating unit, $\alpha$ is the phase variation of the non-modulated carrier during one sampling period, and k' is an integer with $0\leq k'\leq(p/2)-1$, (b) circuits for detecting the sign of this quantities, and (c) logic circuits for reproducing the transmitted phase jumps in accordance with the sign determined by said sign detection circuit.

4. A phase discriminator as claimed in claim 1, for use in a receiver of a system for data transmission by means of p-phase modulation of a carrier in which the data are transmitted in the form of phase jumps of the value $k2\pi/p$, where k is an integer with $0\leq k\leq p-1$, wherein the phase discriminator comprises means for successively increasing after each sampling instant of the passband signal the phase of the reference carrier supplied to the calculating unit with various additional phases of a value $(2k''+1)\pi/p$, where k'' is an integer with $-(p/8-1)\leq k''\leq p/8$, wherein the calculating unit successively applies to the decision circuit means after each sampling instant various pairs of output signals which correspond to said additional phases, the decision circuit means comprising circuits for detecting the sign of the signals of each of said pairs and logic circuits for reproducing the transmitted phase jumps as a function of the signs successively determined by said sign detection circuit after each sampling instant.

5. A phase discriminator as claimed in claim 1, for eight-phase modulation, wherein the error signal is obtained in the decision circuit means depending on the reproduced phase jump, either as one of both signals at its input, as said last signal with changed sign, as the other one of said both signals, as this other one of said both signals which changed sign, as the sum of said both signals, as this sum with changed sign, as the difference between said both signals, or as this difference with changed sign.

6. A phase discriminator as claimed in claim 1, for eight-phase modulation, wherein the error signal is obtained in the decision circuit means depending on the reproduced phase jump, either as the sign of one of both signals at its input, as the opposite sign of this last-mentioned signal, as the sign of the other one of said both signals, as the opposite sign of this other one of said both signals, as the sign of the sum of said both signals, as the opposite sign of this sum, as the sign of the difference between said both signals or as the opposite sign of this difference.

7. A phase discriminator as claimed in claim 1, wherein the phase discriminator further comprises means for increasing after the reproduction of each phase jump the phase of the reference carrier by an additional phase equal to the phase variation of the transmitted carrier corresponding to the reproduced phase jump, the error signal being formed by one of the signals supplied by the calculating unit.

8. A phase discriminator as claimed in claim 1, further comprising a circuit for calculating a phase correction of the reference carrier coupled between said decision circuit and said generator, said phase correction calculating circuit having two branches which each comprise a multiplier for weighting said error signal in accordance with a given coefficient, an adder being connected in one of the branches to the output of said multiplier, which adder co-operates with a memory for obtaining at each sampling instant at the output of this memory the sum of the error signal weighted at the specific sampling instant and the error signal weighted at the preceding sampling instant, and a further adder being connected to the output of the two branches for forming the phase correction signal.

9. A phase discriminator as claimed in claim 8, wherein said generator comprises a circuit having at least one adder and a memory for forming the sum of the phase correction supplied at that specific sampling instant, the phase variation of the transmitted carrier corresponding to the reproduced phase jump, and the phase of the local reference carrier at the preceding sampling instant.

10. A phase discriminator as claimed in claim 1, wherein said generator comprises a read-only-memory in which various values of in-phase and quadrature components of a signal are stored, said memory receiving as read signal a signal corresponding to the phase of the reference carrier and in response to this read signal supplying the corresponding components to the calculating unit.

11. A receiver with a phase discriminator according to claim 1, further comprising a digital auto-adaptive passband equalizer which processes the in-phase and quadrature components of the passband signal received, the equalizer being coupled between said sampler outputs and said calculator unit first input pairs for receiving digital signals whose signal samples occur at a rate equal to the data modulation rate, which digital signals are representative of the in-phase and quadrature components of the passband signal, the digital signals supplied being applied directly at said sample rate to the inputs of the calculating unit of the phase discriminator, which signals are representative of the in-phase and quadrature components of the equalized passband signal.

* * * * *

UNITED STATES PATENT OFFICE
CERTIFICATE OF CORRECTION

Patent No. 4,174,489            Dated November 13, 1979

Inventor(s) LOIC B.Y. GUIDOUX et al

It is certified that error appears in the above-identified patent and that said Letters Patent are hereby corrected as shown below:

On Title Page insert -- [30] Foreign Application

Priority Data  December 29, 1980 [FR] France....

7539962 --

Col. 16, line 34,  Before " -tan" insert -- $\bar{x}$ --

Col. 16, line 36,  Before "are" delete "x" (second occurrence) and insert -- $\bar{x}$ --

Signed and Sealed this

Second Day of June 1981

[SEAL]

Attest:

RENE D. TEGTMEYER

Attesting Officer    Acting Commissioner of Patents and Trademarks